(12) United States Patent
Kerpez et al.

(10) Patent No.: US 9,900,049 B2
(45) Date of Patent: Feb. 20, 2018

(54) SYSTEMS AND METHODS FOR MANAGING MIXED DEPLOYMENTS OF VECTORED AND NON-VECTORED VDSL

(71) Applicant: Adaptive Spectrum and Signal Alignment, Inc., Redwood City, CA (US)

(72) Inventors: Kenneth Kerpez, Long Valley, NJ (US); Mehdi Mohseni, Menlo Park, CA (US); Ardavan Maleki Tehrani, Stanford, CA (US)

( * ) Notice: Subject to any disclaimer, the term of this patent is extended or adjusted under 35 U.S.C. 154(b) by 116 days.

(21) Appl. No.: 14/771,789

(22) PCT Filed: Mar. 1, 2013

(86) PCT No.: PCT/US2013/028750
§ 371 (c)(1),
(2) Date: Aug. 31, 2015

(87) PCT Pub. No.: WO2014/133554
PCT Pub. Date: Sep. 4, 2014

(65) Prior Publication Data
US 2016/0028434 A1     Jan. 28, 2016

(51) Int. Cl.
| | | |
|---|---|---|
| *H04M 9/08* | (2006.01) | |
| *H04B 3/32* | (2006.01) | |
| *H04M 11/06* | (2006.01) | |
| *H04M 3/22* | (2006.01) | |

(52) U.S. Cl.
CPC ............ *H04B 3/32* (2013.01); *H04M 3/2209* (2013.01); *H04M 11/062* (2013.01)

(58) Field of Classification Search
CPC ...... H04B 3/32; H04M 3/2209; H04M 11/062
(Continued)

(56) References Cited

U.S. PATENT DOCUMENTS

| | | | |
|---|---|---|---|
| 8,275,054 B2 * | 9/2012 | Schenk | ............... H04L 12/2861 375/260 |
| 2010/0177838 A1 * | 7/2010 | Schenk | .................... H04B 3/32 375/285 |

(Continued)

FOREIGN PATENT DOCUMENTS

| | | |
|---|---|---|
| EP | 0969605 | 1/2000 |
| EP | 1895672 | 3/2008 |

(Continued)

OTHER PUBLICATIONS

International Search Report and Written Opinion for International Patent Application No. PCT/US2013/028750 dated Nov. 18, 2013, 12 pages.
International Preliminary Report on Patentability for International Patent Application No. PCT/US2013/028750, dated Sep. 11, 2015, 9 pages.

*Primary Examiner* — Hemant Patel
(74) *Attorney, Agent, or Firm* — North Weber & Baugh LLP

(57) ABSTRACT

In accordance with embodiments disclosed herein, there are provided methods, systems, mechanisms, techniques, and apparatuses for managing mixed deployments of vectored and non-vectored VDSL. For example, in one embodiment, there are included means for establishing an operational interface to a communications system, in which the communications system includes a plurality of copper telephone lines organized into at feast a vectored group having a first subset of the plurality of copper telephone lines and a second group having a remaining one or more of the copper telephone Hoes which are not part of the vectored group; means for estimating one or more achievable performance targets such as achievable bit rates for each of the vectored group and the second group; means for selecting an operating point for each of the vectored group and the second group based on the estimated achievable performance targets; means for assigning configurable values to approxi- (Continued)

mate the operating point selected for each of the vectored group and the second group; and means for configuring the communications system via the operational interface to adopt the assigned configurable values. Other related embodiments are further disclosed.

23 Claims, 8 Drawing Sheets

(58) Field of Classification Search
USPC .................................................. 379/406.02
See application file for complete search history.

(56) References Cited

U.S. PATENT DOCUMENTS

| | | | | |
|---|---|---|---|---|
| 2012/0027060 A1* | 2/2012 | Singh | ..................... | H04B 3/487 |
| | | | | 375/222 |
| 2012/0082258 A1* | 4/2012 | Nuzman | ................ | H04B 3/487 |
| | | | | 375/285 |

FOREIGN PATENT DOCUMENTS

| WO | WO-2006/129140 | 12/2006 |
|---|---|---|
| WO | WO-2006129140 | 12/2006 |

\* cited by examiner

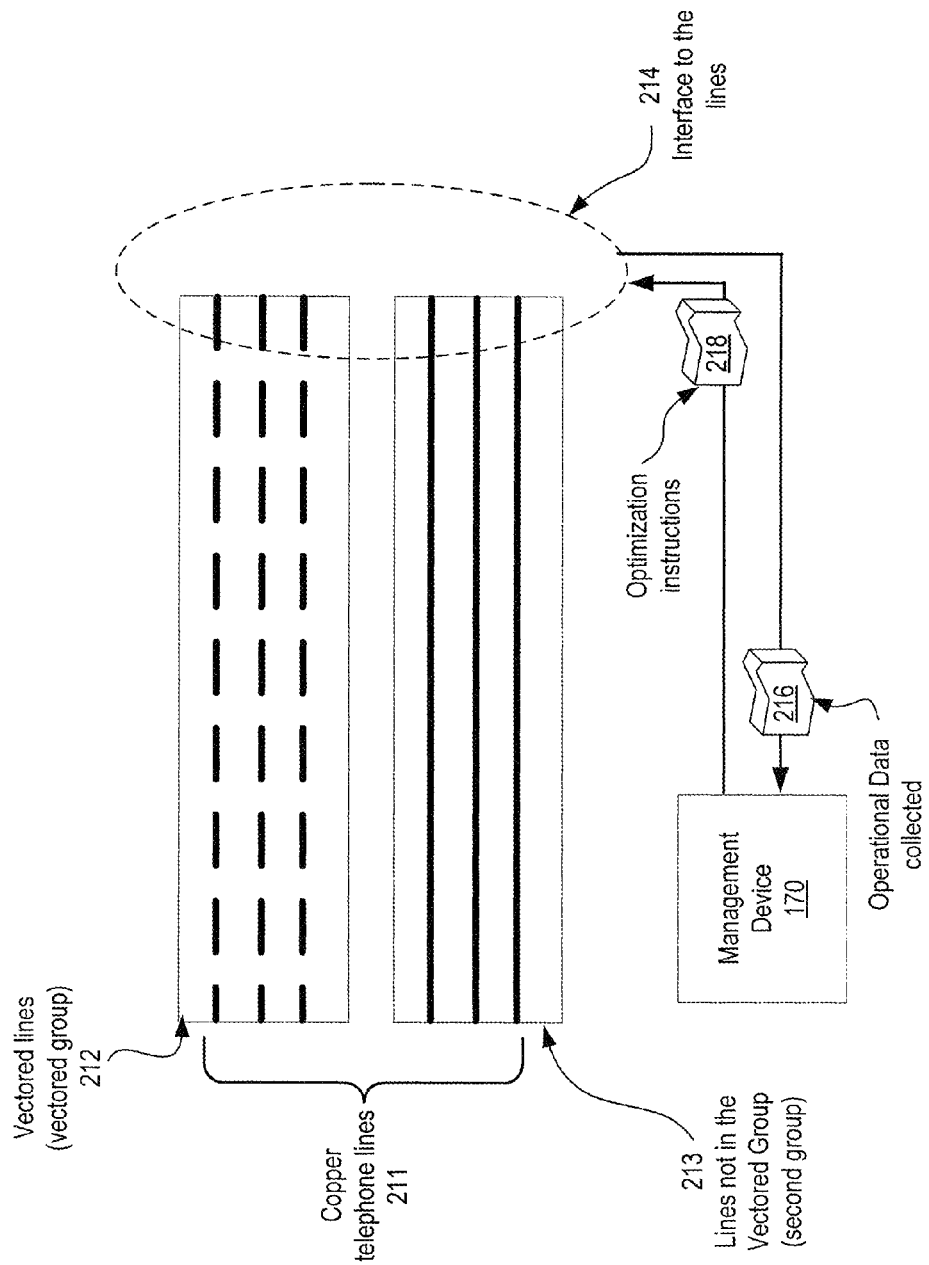

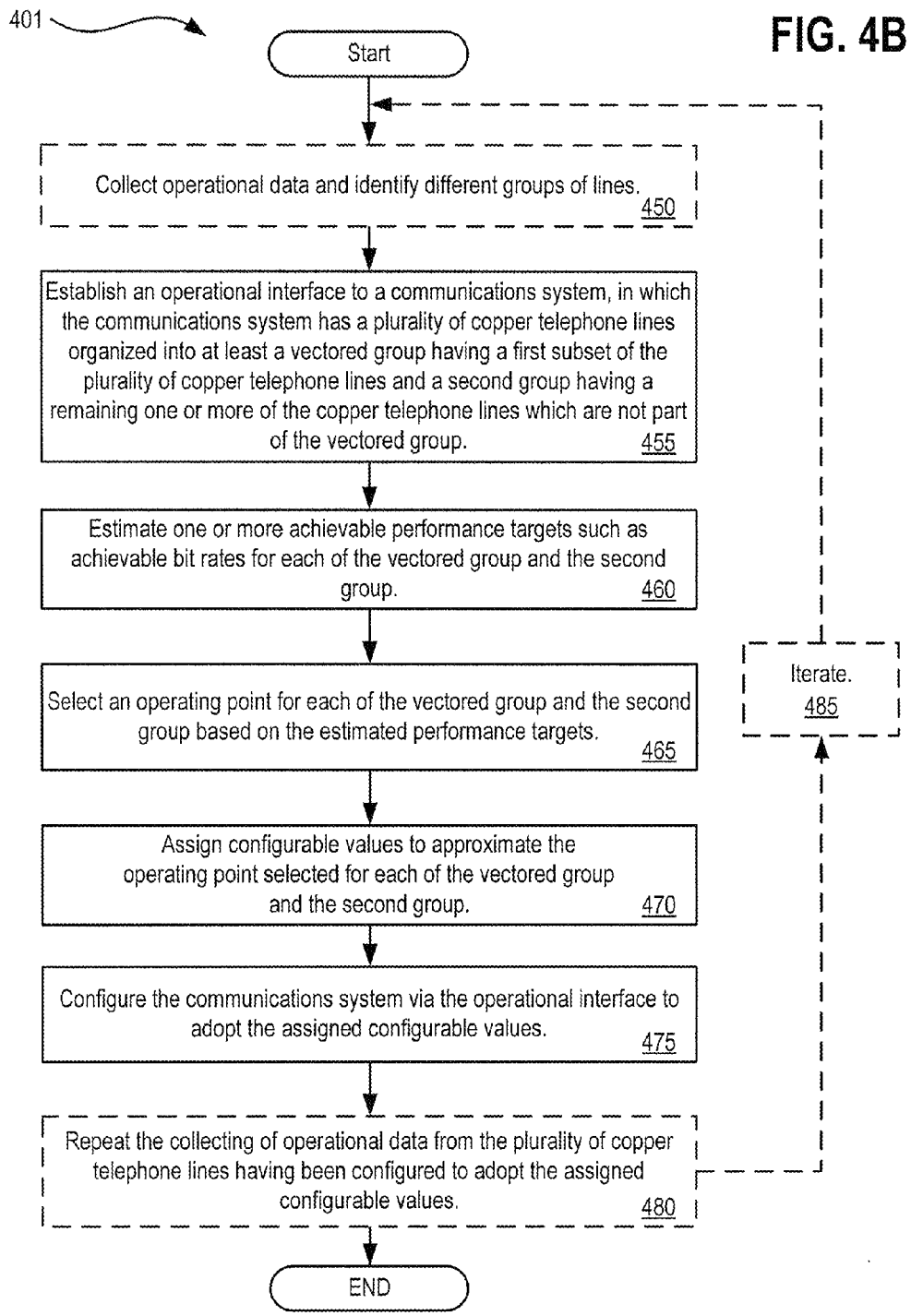

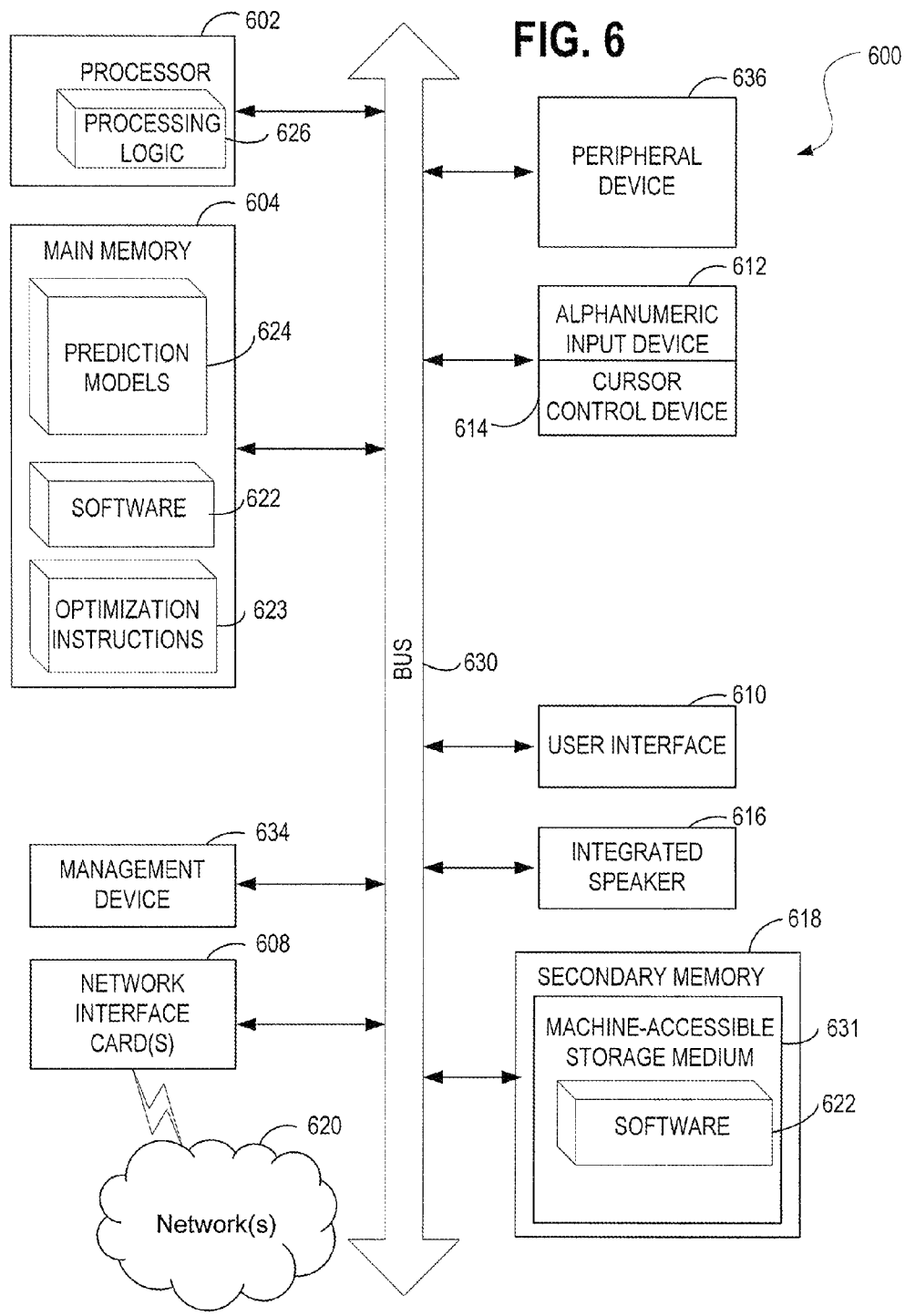

SYSTEMS AND METHODS FOR MANAGING MIXED DEPLOYMENTS OF VECTORED AND NON-VECTORED VDSL

CROSS-REFERENCE TO RELATED APPLICATIONS

This application is the U.S. National Phase application of PCT International Application No. PCT/US2013/028750, filed Mar. 1, 2013, the disclosure of which is incorporated herein by reference in its entirety.

COPYRIGHT NOTICE

A portion of the disclosure of this patent document contains material which is subject to copyright protection. The copyright, owner has no objection to the facsimile reproduction by anyone of the patent, document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for managing mixed deployments of vectored and non-vectored Digital Subscriber Line (DSL) communication technologies including Very-high-bit-rate-DSL (VDSL) and the ITU-T G.fast standards project. The generic term "VDSL" refers to VDSL1, VDSL2, and other non-standard types of VDSL. VDSL is a type of DSL.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Vectored DSL technology aids in mitigating crosstalk effects that degrade performance in deployments of DSL lines operating at high speeds. Crosstalk may be a significant noise source in multi-pair copper cables used for DSL transmission. High speed DSL deployments, such as those with VDSL, are particularly vulnerable to crosstalk for both the downstream and the upstream transmission directions; data rates being limited typically by Far-End-Crosstalk (FEXT). When multiple DSL line pairs share, the same cable they induce crosstalk into each other which negatively affects performance.

Vectored DSL uses advanced signal processing techniques to mitigate crosstalk and thus, improve performance. However, where mitigation techniques may be further improved, additional performance gains are possible. Moreover, mixed deployments of vectored and non-vectored DSL lines are common in the field, and as such, not all lines within a particular cable participate in a vectoring scheme. These non-participating lines escape application of beneficial crosstalk mitigation techniques through vectoring and yet, these non-vectored lines may nevertheless negatively affect the operation of the vectored lines due to, for example, crosstalk coupling onto the vectored lines. Crosstalk cancellation is only performed among the lines within a "vectored group," and if there are multiple distinct vectored groups then the crosstalk between groups may negatively affect operation.

The present state of the art may therefore benefit from systems and methods for managing deployments of mixed vectored and non-vectored DSL and deployments of multiple vectored groups using communication technologies including VDSL as is described herein.

BRIEF DESCRIPTION OF THE DRAWINGS

Embodiments are illustrated by way of example, and not by way of limitation, and will be more folly understood with reference to the following detailed description when considered in connection with the figures in which:

FIG. 2B illustrates another exemplary architecture in which embodiments may operate;

FIGS. 4A and 4B are flow diagrams illustrating methods for managing mixed deployments of vectored and non-vectored. VDSL in accordance with described embodiments;

FIG. 6 illustrates a diagrammatic representation of a machine in the exemplary form of a computer system, in accordance with one embodiment.

DETAILED DESCRIPTION

Figure 1:
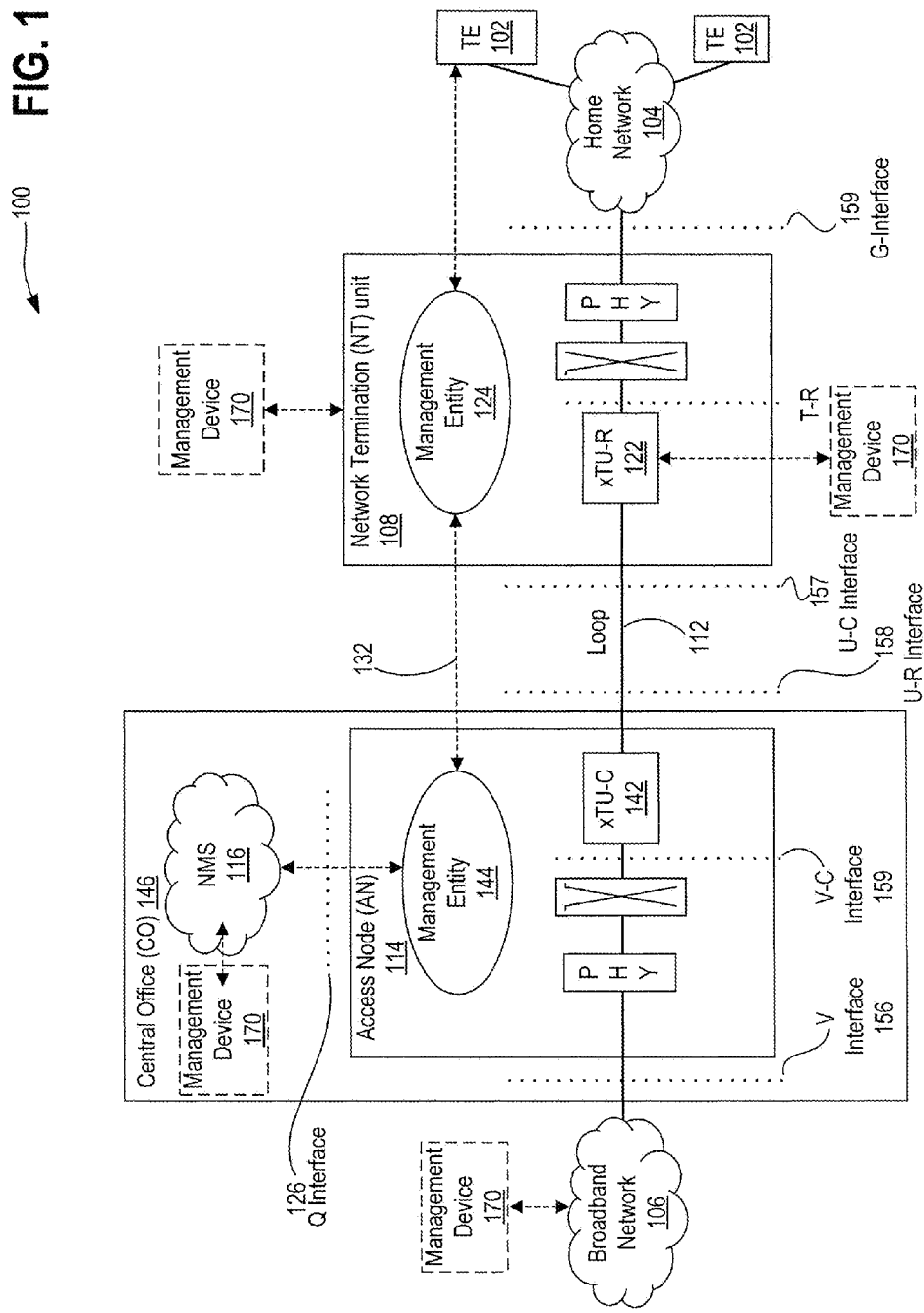
FIG. 1 illustrates an exemplary architecture in which embodiments may operate.

Described herein are systems and methods for managing deployments of mixed vectored and non-vectored DSL and deployments of multiple vectored groups using communication technologies including VDSL.

For example, in one embodiment, there are included means for establishing an operational interface to a communications system, in which the communications system includes a plurality of copper telephone lines organized into at least a vectored group having a first subset of the plurality of copper telephone lines and a second group having a remaining one or more of the copper telephone lines which are not part of the vectored group; means for estimating one or more achievable performance targets such as achievable bit rates for each of the vectored group and the second group; means for selecting an operating point for each of the vectored group and the second group based on the estimated achievable performance targets; means for assigning configurable values to approximate the operating point selected for each of the vectored group and the second group; and means for configuring the communications system via the operational interface to adopt the assigned configurable values.

Far-end crosstalk (FEXT) is noise affecting communications due to electromagnetic coupling between lines transmitting in the same cable. FEXT is often the dominant noise for VDSL lines. Vectoring, as described in the ITU-T G.993.5 standard, cancels most FEXT between VDSL lines, however, vectoring is only effective as to those lines within a single vectored group which originate at a single Digital subscriber line access multiplexer (DSLAM) or at a single DSLAM line card. Vectoring may also be used with other transmission systems that transmit over multi-pair copper cables, such as G.fast each of which may be vectored or non-vectored. The described techniques are additionally useful in achieving spectral compatibility among different types of transmission systems.

Where multiple vectored groups exist within a single cable, each of the different vectored groups having respective VDSL lines therein will suffer performance degradation in the lines of the respective vectored groups due to the presence of alien crosstalk. For instance, lines in a first vectored group will appear as alien disturbers to lines in a second vectored group. A similar situation arises with a mixed deployment in which a group of lines that are not vectored shares a cable with a vectored group of vectored lines. In such a mixed deployment, alien crosstalk from the non-vectored lines negatively affects the vectored lines of the vectored group and vice-versa, thus resulting in potentially unexpected service degradation, particularly to the vectored lines.

Past solutions make the false assumption that all lines in a given cable are vectored or can be vectored, but this is a false premise, and will remain false until such time that vectoring each cable with a single vectored group is ubiquitous. Until such time, the problem of accommodating non-vectored lines which inevitably act as alien crosstalkers to the vectored lines must be dealt with in a predictable manner so as to yield stable and knowable results for the communications system.

Use of conventional vectoring technologies simply fails to account for negative effects associated with such mixed deployments in which non-vectored lines exhibit alien crosstalk coupling onto the lines of a vectored group. Thus, the current state-of-the art results in an uncontrolled and negative impact on the vectored lines which can result in delivered service levels dropping below the minimum, necessary threshold for those vectored lines. For example, a service provider may promise its customer/subscriber an exemplary 100-Mbit/s transfer speed at a particular premium pricing tier. Such a provider would include the corresponding copper telephone line for the corresponding customer/subscriber into the vectored group and operate the line accordingly. Yet those lines not participating within the vectored group (e.g., possibly because they operate according to a lower and less preferred pricing tier) can negatively affect performance of the vectored lines, causing the vectored lines to fall below the promised operational threshold, thus frustrating the customer/subscriber who does not get the paid for and promised service as well as the service provider whom has failed to deliver to the promised service level.

The preceding example is illustrative of how these problems arise within the field as well. While perfectly cancelled FEXT through complete adoption and application of vectoring technologies may be theoretically attainable in a laboratory setting, actual field deployments are far more complex and do not adhere to such theoretical constructs. For instance, vectoring equipment requires a costly capital outlay for a communications system operator, such as a DSL services provider, and as such, it is common for some lines to be included within a vectored group, but not others, simply due to the application of a limited set of vectoring resources. Further still, copper telephone lines or so called "loops" between Customer Premises Equipment (CPE), such as a subscriber's modem and the equipment of the communications system operator, such as a DSLAM or other equipment at the Central Office (CO) are likely to service multiple different customers, some of which may not have paid for the higher price premium service tiers, and as such, the communications system operator lacks the financial incentive, to "upgrade" these lower service tier customers. Other reasons that such problems arise may include the presence of multiple DSLAMs at a cabinet, multiple line cards on a single DSLAM with no vectoring between the cards, exchange deployments, unbundled loops with DSLAMs owned by different operators, and upgrade scenarios from legacy non-vectored VDSL to vectored VDSL.

Regardless of the reasons which result in mixed deployments of vectored lines, there remains a need to accommodate such deployments.

In the following description, numerous specific details are set forth such as examples of specific systems, languages, components, etc., in order to provide a thorough understanding of the various embodiments, it will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may lie stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein, in another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language, it will be appreciated that a variety of programming languages may be used to implement the teachings of the embodiments as described herein.

FIG. 1 illustrates an exemplary architecture 100 in which embodiments may operate in compliance with the G.997.1 standard (also known as G.ploam). Asymmetric Digital Subscriber Line (ADSL) systems (one form of Digital Subscriber Line (DSL) systems), which may or may not include splitters, operate in compliance with the various applicable standards such as ADSL1 (0.992.1), ADSL-Lite (0.992.2), ADSL2 (G.992.3), ADSL2-Lite G.992.4, ADSL2+ (G.992.5) and the G.993.x emerging Very-high-speed Digital Subscriber line or Very-high-bitrate Digital Subscriber Line (VDSL) standards, as well, as the G.991.1 and G.991.2 Single-Pair High-speed Digital Subscriber Line (SHDSL) standards, all with and without bonding, and/or the G.997.1 standard (also known as G.ploam).

The G.997.1 standard specifies the physical layer management for ADSL transmission systems based on the clear. Embedded Operation Channel (EOC) defined in G.997.1 and use of indicator bits and HOC messages defined in the G.992.x, G.993.x and G.998.4 standards. Moreover, G.997.1 specifies network management elements content for configuration and performance management. In performing the disclosed functions, systems may utilize a variety of operational data (which includes performance data) that is available at an Access Node (AN).

In FIG. 1, users terminal equipment (TE) 102 (e.g., a Customer Premises Equipment (CPE) device or a remote terminal device, network node, LAN device, etc) is coupled to a home network 104, which in turn is coupled to a Network Termination (NT) Unit 108. Multiple xTU devices ("all Transceiver Unit" devices) are further depicted. An xTU provides modulation for a DSL loop or line (e.g., DSL, ADSL, VDSL, etc.). In one embodiment NT unit 108 includes an xTU-R (xTU Remote) 122 (for example, a transceiver defined by one of the ADSL or VDSL standards), or any other suitable network termination modem, transceiver or other communication unit. NT unit 108 also includes a Management Entity (ME) 124. Management Entity 124 may be any suitable hardware device, such as a microprocessor, microcontroller, or circuit state machine in firmware or hardware, capable of performing as required by any applicable standards and/or other criteria. Management Entity 124 collects and stores, among other things, operational, data in its Management Information Base (MiB), which is a database of information maintained by each ME capable of being accessed via network management protocols such as Simple Network Management Protocol (SNMP), an administration protocol used to gather information from a network device to provide to an administrator console/program; via Transaction Language 1. (TL1) commands, TL1 being a long-established command language used to program responses and commands between telecommunication network elements; or via a TR-69 based protocol. "TR-69" or "Technical Report 069" is in reference to a DSL Forum technical specification entitled CPE WAN Management Protocol (CWMP) which defines an application layer protocol for remote management of end-user devices, XML or "extended Markup Language" compliant programming and interface tools may also be used.

Each xTU-R 122 in a system may be coupled with an xTU-C (xTU Central) in a Central Office (CO) or other central location. The xTU-C 142 is located at an Access Node (AN) 114 in Central Office (CO) 146. A Management Entity 144 likewise maintains an MIB of operational data pertaining to xTU-C 142. The Access Node 114 may be coupled to a broadband network 106 or other network, as will be appreciated by those skilled in the art. Each of xTU-R 122 and xTU-C 142 are coupled together by a U-interface/loop 112, which in the case of ADSL may be a twisted pair line, such as a telephone line, which, may carry other communication services besides DSL based communications. Either Management Entity 124 or Management Entity 144 may implement and incorporate a management device 170 as described herein. The management device 170 may be operated by a service provider or may be operated by a third party, separate from the entity which provides DSL services to end-users. Thus, in accordance with one embodiment, the management device 170 is operated and managed by an entity which is separate and distinct from a telecommunications operator responsible for a plurality of digital communication lines such as copper twisted pair telephone lines over which such telecommunication services are delivered to subscribers/customers. For instance, the management device may operate within the so called cloud as a cloud service provided by a third party which, is not the communications system operator or the service provider for the communications system.

Several of the interlaces shown in FIG. 1 are used for determining and collecting operational data. The Q interface 126 provides the Interface between the Network Management System (NMS) 116 of the operator and Management Entity 144 in Access Node 114. Parameters, specified in the G.997.1 standard apply at the Q interface 126. The near-end parameters supported in Management Entity 144 may be derived from xTU-C 142, while far-end parameters from xTU-R 122 may be derived by either of two interfaces over the U-interface. Indicator bits and HOC messages may be sent using embedded channel 132 and provided at the Physical Medium Dependent (PMD) layer, and may be used to generate the required xTU-R 122 parameters in Management Entity 144. Alternately, the Operations, Administration and Maintenance (GAM) channel and a suitable protocol may be used to retrieve the parameters from xTU-R 122 when requested by Management Entity 144. Similarly, the far-end parameters from xTU-C 142 may be derived by either of two Interfaces over the U-interface. Indicator bits and EOC message provided at the PMD layer may be used to generate the required xTU-C 142 parameters in Management Entity 124 of NT unit 108. Alternately, the DAM channel and a suitable protocol may be used to retrieve the parameters from xTU-C 142 when requested by Management Entity 124.

At the U-interface (also referred to as loop 112), there are two management interfaces, one at xTU-C 142 (the U-C interface 157) and one at xTU-R 122 (the UR interface 158). The U-C interface 157 provides xTU-C near-end parameters for xTU-R 122 to retrieve over the U-interface/loop 112. Similarly, the U-R interface 158 provides xTU-R near-end parameters for xTU-C 142 to retrieve over the U-interface/loop 112. Interfaces V 156 and V-C 159 are further depicted within the CO 146 at different points of the loop 112. The parameters that apply may be dependent upon the transceiver standard being used (for example, G.992.1 or G.992.2). The G.997.1 standard specifies an optional Operation, Administration, and Maintenance (OAM) communication channel across the U-interface. If this channel is implemented, xTU-C and xTU-R pairs may use it for transporting physical layer OAM messages. Thus, the xTU transceivers 122 and 142 of such a system share various operational data maintained in their respective MIBs.

Depicted within FIG. 1 is management device 170 operating at various optional locations in accordance with several alternative embodiments. For example, management device 170 may be located, within central office 146 and interfaced broadband network 106 (e.g., a WAN) via Network Management System (NMS) 116. In yet another embodiment, management device 170 is connected with a NT unit 108 or with xTU-R 122 over the G-interface 159.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet, service provider, or any service that may independently or In conjunction with a broadband communications service provider offer services that, diagnose or improve broadband communications services (DSL, DSL services, cable, etc.).

Additionally, as used herein, the term "DSL" refers to any of a variety and/or variant of DSL technology such as, for example. Asymmetric DSL (ADSL), High-speed DSL (HDSL), Symmetric DSL (SDSL), and/or Very high-speed/ Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U, standard G.992.5 (a.k.a. G.adsl2plus) for ADSL2+ moderns, I.T.U. standard G.993.1 (a.k.a, G.vdsl) for VDSL modems, I.T.U. standard G.993.2 for VDSL2 modems, I.T.U. standard G.993.5 for DSL modems supporting Vectoring, I.T.U, standard G.998.4 for DSL modems supporting retransmission functionality, I.T.U. standard G.994.1 (G.hs) tor modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems. Ultra High Frequency (UHF)/ Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ON U) may be used.

The phrases "coupled to," "coupled with," "connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

Figure 2A:
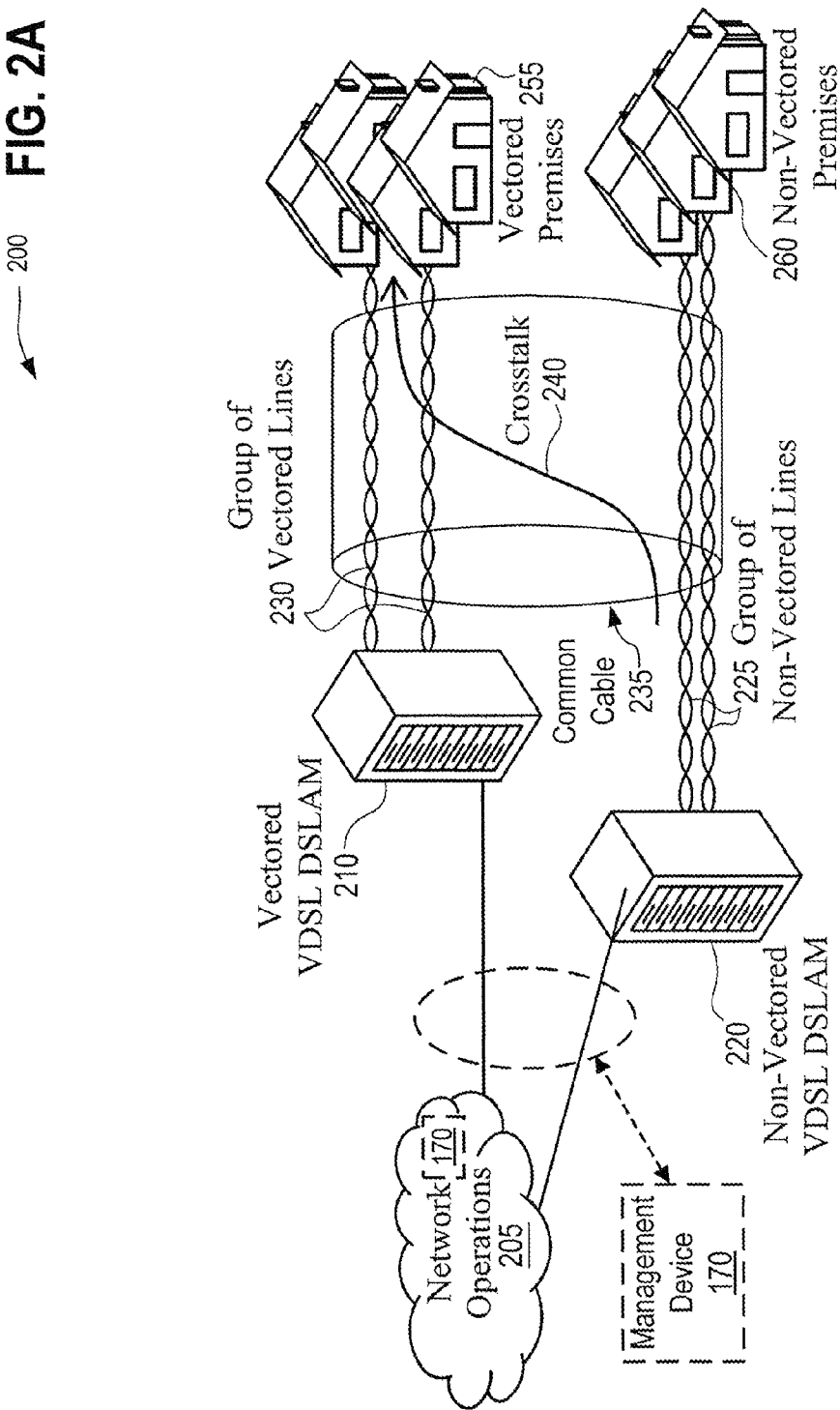
FIG. 2A illustrates another exemplary architecture in which embodiments may operate.

FIG. 2A illustrates another exemplary architecture 200 in which embodiments may operate. In particular, there is depicted a vectored group of lines depicted by element 230 and also a group of non-vectored lines depicted by element 225. As can be seen from the figure, both the non-vectored group of lines 225 and the vectored group of lines share the same common cable 235 resulting in the two distinct groups 225 and 230 of lines having crosstalk 240 between them. This crosstalk may be considered alien crosstalk 240, and as depicted, may originate from the group of non-vectored lines 225 and electromagnetically couple onto the group of vectored lines 230, negatively affecting the group of vectored lines 230 due to the crosstalk 240 being un-cancelled by the vectoring applied to the group of vectored lines. Although same-binder crosstalk is strongest, crosstalk between binders is significant in many cases and so vectoring often spans multiple binders within, a single cable 235.

With nearly all FEXT from in-domain disturbers (e.g., noise from other vectored lines in the same vectored group) being cancelled by vectoring, the remaining sources of interference (e.g. Radio Frequency Interference (RFI), impulse noise from electrical services in the home. Interference from broadband power line communications, alien crosstalk, etc.) become the dominant noise affecting communications on such vectored lines, in some lines, these alien noises which, generally cannot be cancelled may be nearly as high as or higher than the in-domain self-FEXT that can be cancelled through vectoring.

Additionally depicted by the exemplary architecture 200 are some of the various architectural components of a communications system so as to provide some context for the described solutions taught herein. For instance, network operations 205 may be instituted by a communications system operator, such as a telephone company or other entity which operates the communications equipment, provides communication services to the customers, or both. Management device 170 depicted at FIG. 1 may be implemented at network operations 205. Alternatively, management device 170 may exist external from network operations 205, such as at a third party service provider which is communicatively interfaced with network operations 205 or with the BSLAMs 210 and 220 depicted, or both.

The group of vectored lines 230 is shown providing communication services to a plurality of vectored premises 255 via the vectored VDSL DSLAM 210 on the opposite side of the common cable 235. Similarly, the group of non-vectored lines 225 is shown providing communication services to a plurality of non-vectored premises 260 via the non-vectored VDSL DSLAM 220 on the opposite side of the common cable 235. In other embodiments, both DSLAMs 210 and 220 may be vectored DSLAMs, and have lines traversing the common cable 235 to a plurality of vectored premises, but the disparate vectored DSLAMs may establish distinct vectored groups, and as such, each of the vectored groups may exhibit alien crosstalk 240 onto the other, despite each establishing a vectored group which satisfactorily cancels in-domain FEXT, DSLAMs 210 and 220 may also be embodied by separate line cards within a single DSLAM.

FIG. 2B illustrates another exemplary architecture 201 in which embodiments may operate. In particular, the copper telephone lines 211 are depicted in additional detail, broken down into two distinct groups in this particular example. Specifically, there is a first subset of the copper telephone lines 211 that are vectored lines and thus constitute the vectored group 212 and there is a second subset of the copper telephone lines 211 that are not in the vectored group and thus constitute the second group 213.

Management device 170 is depicted as being communicatively interfaced with the plurality of copper telephone lines 211 through the interface to the lines at element 214. For instance, the interface may traverse through transceivers, CPE modems, DSLAMs, or other equipment so as to provide a communications interface between the copper telephone lines and the management device 170 such that the management device 170 is capable to collect operational data 216 from the copper telephone lines 211 and additionally issue or send optimization instructions 218 including, for example, configuration changes, to the copper telephone lines 211 as depicted by the information flow elements between the copper telephone lines 211 and the management device 170.

Figure 3:
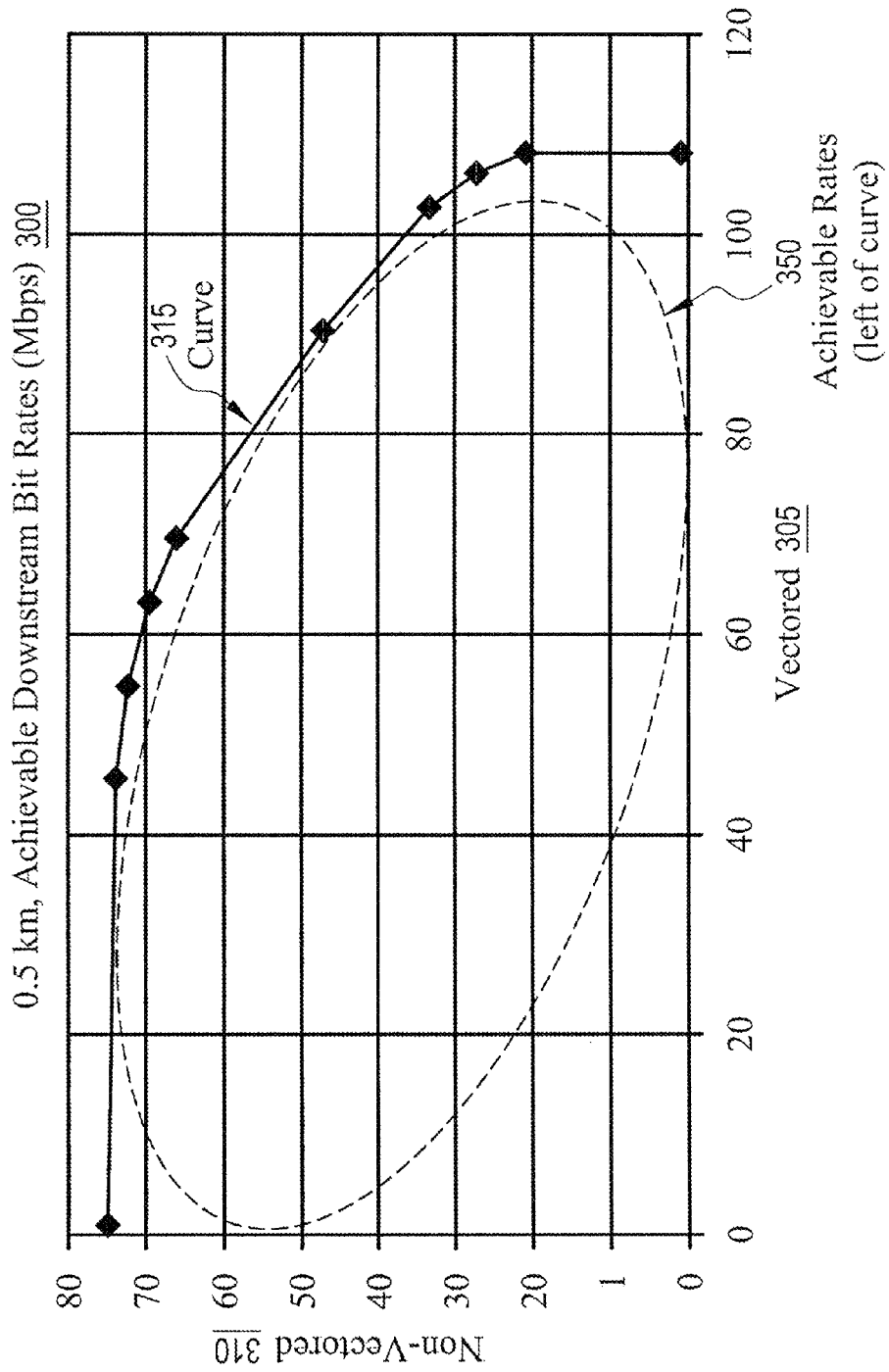
FIG. 3 provides an exemplary chart depicting achievable downstream bit rates in accordance with described embodiments.

FIG. 3 provides an exemplary chart 300 depicting achievable downstream bit rates in accordance with described embodiments, in particular, chart 300 depicts for an exemplary 0.5 km loop, the achievable downstream bit rates in Mbps as per the curve 315 in which element 350 denotes that the achievable rates are those to the left of the curve 315. Non-vectored rates are represented on the vertical axis 310 and vectored rates are represented, on the horizontal axis 305.

With the exemplary chart 300, there are collocated endpoints for the various lines, including an exemplary two vectored and two non-vectored lines within the same cable and/or binder, thus resulting in any point to the left of and below the curve being achievable as represented generally within the area of the hashed ellipse denoted by element 350. The depicted set of achievable rates 350 is only one example. The set of achievable rates can vary with different copper transmission environments and different transmission configurations.

It known and well established that tradeoffs exist between performance of a vectored group of lines and performance of a group of non-vectored lines, or alternatively, between, two distinct vectored groups of lines, and such tradeoffs are depicted by the exemplary chart 300.

The means for achieving these tradeoffs, however, has not been solved by conventional vectoring solutions. Instead, vectoring solutions to date attend only to those fines within a vectored group or require that ail lines be added to the vectored group, thus addressing in-domain FEXT amongst the lines of the vectored group, without accounting for alien crosstalk exhibited from other groups of lines, be they within another but distinct vectored group of lines or within a group of lines which is not vectored. This approach which effectively ignores those fines which are not within the vectored group leaves the vectored group susceptible to such alien noises without any means for optimizing the entire population of lines, vectored or otherwise, by exploiting the tradeoffs depicted at chart 300.

The described embodiments provide means for managing mixed deployments of vectored and non-vectored DSL communication technologies, including VDSL lines, as well as managing separate and distinct vectored groups of lines that share a common cable, such that any chosen operating point, within the achievable rates 350, may be attained through exploitation of the tradeoffs depicted, as will be described in additional detail with reference to the flow diagram that follows.

Figure 4A:
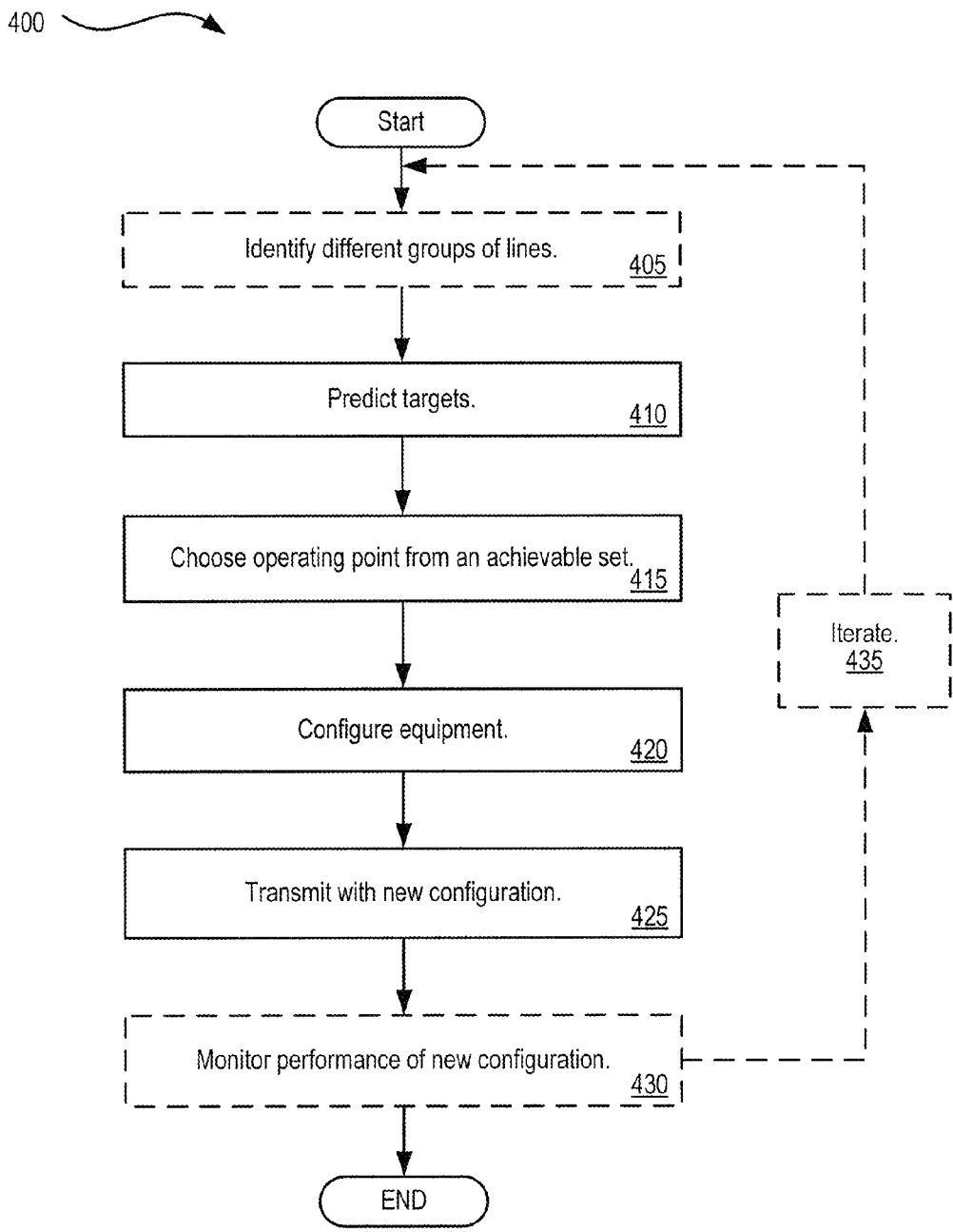

FIGS. 4A and 4B are flow diagrams illustrating methods 400 and 401 for managing mixed deployments of vectored and non-vectored VDSL in accordance with described embodiments. Methods 400 and 401 may be performed by processing logic that may include hardware (e.g., circuitry, dedicated logic, programmable logic, microcode, etc.), software (e.g., instructions run on a processing device to perform various operations such as interfacing functions, identifying, estimating, selecting, assigning, configuring, collecting, monitoring, diagnosing and reporting information, executing/initiating optimization instructions, calculations, or some combination thereof). In one embodiment, method 400 and 401 are performed or coordinated via a management device such as that depicted at element 170 of FIG. 1 and at element 501 of FIG. 5. Some of the blocks and/or operations listed below are optional in accordance with certain embodiments. The numbering of the blocks presented is for the sake of clarity and is not intended to prescribe an order of operations in which the various blocks must occur. Additionally, operations from, method 400 and 401 may be utilized in a variety of combinations.

FIG. 4A begins with a generalized process flow for method 400 in which operations begin at block 405 with processing logic for identifying different groups of lines. Block 405 may not necessarily be perforated as it is feasible that the groups of lines to be subjected to processing are already identified, that is, they are already known.

Nevertheless, processing may identify a vectored group of lines and a non-vectored group of lines or processing may identify a first vectored group and a second vectored group, in certain embodiments there may be multiple separate vectored groups, more than two, in any combination of vectored and non-vectored, so long as there is a minimum of one vectored group. Moreover, the groups identified may be further divided into groups of similar loop lengths, into groups according to similar FEXT coupling levels, or into groups according to similar service levels or service tiers. At the most extreme, a single line may permissibly be considered as its own group and still be operable according to the methodologies described herein. That is to say, a single line may constitute one of the identified groups.

At block 410, processing logic predicts targets. Prediction may take any of several forms. For instance, in one embodiment processing logic predicts the set of bit rates and other performance targets that can be jointly achieved by the different groups of lines previously identified. This prediction has varying levels of accuracy, depending on the available input information.

For instance, there may be a general prediction which is made for an entire regional loop plant with little or no specific information other than statistical properties of that loop plant. Such an approach may be useful for business agreements, regulations, and network planning. Knowledge of cable fill and loop lengths will additionally serve to increase the accuracy of such generalized predictions.

There may additionally be a prediction which is made more accurately using specific knowledge of a deployment, such as the numbers of lines, cable and binder assignments for the known number of lines, line lengths for those lines, the levels of crosstalk coupling amongst the lines, background noise levels affecting the lines, and so forth. Computer simulation models developed for DSL lines can accurately predict bit rates within a few percent error and thus may prove useful in establishing these more accurate predictions using specific deployment knowledge.

There may additionally be a prediction made which is further enhanced by using knowledge of specific equipment performance and capabilities. For example, some equipment in support of the lines may only support simple flat Power Spectral Density (PSD) bit-loading algorithms while other equipment may support more advanced bit-loading algorithms such as waterfilling.

At block 415, processing logic chooses an operating point from an achievable set.

Using the predicted targets from the prior operation as guidance, a particular set of achievable bit rates or other performance targets are chosen for each identified group of lines. This operating point is generally chosen to achieve high performance. In certain embodiments it may be desirable to protect vectored lines within a vectored group, even to the detriment of non-vectored lines which provide communication services to customers but are not within the vectored group. For instance, a communications system operator may give preference to higher price point tiers which correlate to the vectored group than to lower price point performance tiers which correlate to the non-vectored lines. In such an embodiment, the performance target of the vectored lines would thus be chosen to be higher than, that, of the non-vectored lines. Where different users subscribe to different service levels the targets may be chosen with an aim to satisfy these varying service levels while still being achievable according to the predictions made. Other policy considerations may contribute to the selection of the chosen targets. Additionally, a range of targets may be chosen, or the targets may be established as general guidelines rather than, for example, firm thresholds, bands, or limits, such that application of tire process flow simply emphasizes the performance of one group while de-emphasizing the performance of another group.

At block 420 processing logic configures the equipment. For instance, equipment in support of the identified groups of lines is configured to approximately achieve the chosen performance targets. Configuration may take various forms including assigning transmission parameters such as target bit rates, transmit powers, noise margins, or transmit Power Spectral Densities (PSDs) to each group of lines. Similarly, line profiles may be assigned, where available, to effect the configuration. The assignment may be based on the prediction at block 410 such that relevant operating parameters may be found, using the established predictions, to achieve a given target operating point which is chosen. For example, where the target is a set of bit rates then transmit power levels which are predicted to achieve those bit rates can be determined according to the prediction and assigned to the equipment as part of the configuration. A single transmission parameter value may be used or multiple parameter values may be used. Additionally, ranges for parameter values may be configured for each group of lines identified.

At block 425, processing logic transmits with the new configuration. For instance, once transceivers for the respective lines are configured, or other equipment in support of the lines are so configured, then the transceivers will transmit using the newly configured parameters, values, ranges, settings, targets, profiles, etc. If equipment in support of the lines is assigned a range of configured parameters, then the equipment itself may select a particular parameter value that is within the configured range for use during operation.

At block 430, processing logic monitors performance of the new configuration. Monitoring is not always necessary and processing may simply end, however, in other embodiments, performance of the new configuration is monitored and the process flow may further iterate through block 435, returning to the beginning of the process, such that repetition of the process may yield further operational improvement. During iterations, some previously performed operations may be skipped, such as predicting targets 410 and choosing an operating point 415.

Where performance is monitored at block 430, operation of the transceivers, the lines, the identified groups, and so forth may be conducted, so as to accommodate changes in the operational environment and maintain the system near the desired operating point as necessary, or so as to continuously work toward, an optimal state through repeated refinement and improvement of the operational parameters configured for the equipment.

Separate groups can be managed separately, but centralized management, or at least some coordination via data sharing, may be desirable and can be more effective than isolated and non-coordinated management. Such management may be broadened to also advantageously improve stability, improve throughput, and optimize power management with re-profiling.

There are many different factors that can go into choosing a particular operating point at block 415. A common criteria is to maximize speeds while minimizing crosstalk, however, such an approach yields conflicting results and may not always be the best criteria. A line's speed is generally maximized by transmitting at maximum transmit power, yet maximizing transmit power also maximizes crosstalk for such a line, rather than minimizing or reducing crosstalk as would be desirable. This contention is precisely why the jointly achievable sets of bit rates should be identified through prediction and estimation means and a particular achievable point should be chosen based on the predictive models or estimates utilized. With the achievable operating point chosen, all of the plurality of lines within the different groups may be balanced in terms of crosstalk, or at least manipulated collectively, so as to attain the selected operating point through exploitation of the tradeoffs described earlier. In some cases a first group of lines only needs to achieve a certain modest target bit rate, then a second group of lines may be set to run as fast as possible while allowing the first group of lines to achieve their target.

A tenant of communication, theory and optimization of communication systems more generally is to assign more resources to lines or frequencies with low noise and attenuation, and to assign fewer resources to those lines or frequencies having higher noise and attenuation. The well known "waterfilling" technique implements such an approach. In certain embodiments, shorter lines which will typically exhibit lower attenuation will therefore be assigned higher bit rates.

The FEXT coupling between any two lines in the same multi-pair cable may vary by tens of dBs with different lines. Some lines have high FEXT couplings to other lines while others have low FEXT couplings. To optimize an ensemble of line speeds, the lines with higher FEXT couplings may be assigned low transmit powers, bit rates, or transmit PSD levels. These lines will then achieve relatively low bit rates; however, the average bit rate across all of the crosstalking lines will be increased overall, thus resulting in a net increase for the communications system as a whole.

It is possible to estimate the FEXT that is output from a line by estimating the FEXT that is received on the line, since FEXT couplings are largely symmetric. Thus, according to certain embodiments, a received FEXT level is used to predict or estimate an output FEXT level and those hues with high received FEXT, and therefore high estimated output FEXT, are set to transmit at lower power levels than lines with low received FEXT, and therefore low estimated output FEXT. In such a way, the transmit powers or bit rates are bounded according to the detrimental effect on other lines which in turn bounds the output crosstalk, not just the transmitted power or PSD level.

Performance targets chosen at block 415 can be approximately achieved in different ways. The speed of non-vectored lines may simply be limited with a fixed margin causing the non-vectored lines to start up and operate at a low transmit power. Such an approach then indirectly enables the vectored lines to achieve a target in the presence of the limited crosstalk by the non-vectored lines. Alternatively, the vectored lines speeds may be limited, varying the speed limit with loop length, service level, and FEXT coupling level. A range of speed limits may be specified instead of a single limit.

A combination of both vectored speed targets and non-vectored speed targets may be more useful for choosing the particular operating point. For example, it may be desired to have the non-vectored line speeds to hit a target range of 38 to 50 Mbps, while vectored line speeds are to hit a target of 60 to 100 Mbps. Such an approach may provide a practical, way to satisfy contracted, advertized, or promised service requirements for the differing service tiers.

In a given transmit environment, a combination of target bit rate, target margin, transmit power, or transmit PSD will achieve a certain operating point, and any one or more of these parameters may be varied interchangeably so as to facilitate the attainable targets through reconfiguration of equipment as necessary.

In certain instances, a service provider may not wish to compromise on the service rate for particular lines which must maintain a minimum, performance threshold regardless of the other lines' operating points. The other lines may have a soft target, allowing the bit rate to fall somewhat below the specified target, if necessary. Each line may be weighted by service level or other criteria, or lines may be prioritized, ranked, or ordered for preferential treatment. A fairness criteria may be used to determine targets, or any other objective function may be maximized.

Once configured, the lines at start-up will seek to maximize their own speeds, in accordance with their assigned parameters. The lines should also start-up with an aim of limiting output crosstalk. The lines may simply implement a flat. Power Back-Off (PBO), or use waterfilling or Iterative Water-Filling (IWF), or any other reasonable bit-loading algorithm. The lines may self-select a particular operating point within an allowable range if they are configured to operate within a range of parameter values.

In certain embodiments, operations of method 400 are implemented in a fully centralized management system. In other embodiments, operations are at least partially distributed. Where control exists over a first group of lines bat not over a second group of lines identified, then management may proceed fully independently, or be partially independent with some shared information between the groups. A fully distributed system may simply implement a blanket set of rules for an entire loop plant; for example, by limiting the speed, transmit power, or transmit PSD of all the non-vectored lines sharing a cable with vectored lines to a particular value. Alternatively, targets may be set for each group of lines based, for example, on estimated line length for the various lines. In such a way, a distributed system may utilize whatever information it has available to estimate the impact on potential victim lines that would be negatively affected by the configured line's crosstalk, and then seek to limit that negative impact.

Partially independent distributed implementations may populate and access information residing within a common database. Such a database may, for example, include loop topology information, information on the transmission parameters of the different lines, information on estimated and/or actual interactions and crosstalk between lines, and information on target service levels. This information, as available, may be used to estimate performance targets such as achievable rates, and select targets and transmission parameters to achieve those targets.

Once crosstalk is effectively managed, other noise becomes relatively more important, such as time-varying impulsive noise and radio ingress. Combining FEXT management with noise, stability, throughput, and power management yields an important new combination of management functions. Profile Optimization (PO) may be utilized for implementing such combined management functions.

FIG. 4B sets forth method 401 having a more detailed implementation of the means for managing mixed deployments of vectored and non-vectored DSL communication technologies including VDSL in contrast to the generalized process flow as set forth by method 400.

Method 401 begins with block 450 in which processing logic collects operational data and identities different groups of lines. Collecting operational data may occur optionally, for instance, in situations where the method 401 repeats through Iteration block 485. Thus, collecting operational data as set forth by block 450 may not necessarily occur prior to block 455, or at all in some instances. Collection of operational data in 450 generally includes the identities of different groups of lines.

At block 455, processing logic establishes an operational interface to a communications system, in which the communications system has a plurality of copper telephone lines organized into at least a vectored group having a first subset of the plurality of copper telephone lines and a second group having a remaining one or more of the copper telephone lines which are not part of the vectored group. When the method repeats or iterates through block 485, it is not necessary to repeat operations to establish the operational interface to the communications system where such an operational interface has previously been established.

At block 460, processing logic estimates one or more achievable performance targets such as achievable bit rates for each of the vectored group and the second group.

In embodiments where operational data is collected, the estimating performance targets, such as achievable bit rates may be based at least in part on the operational data collected.

At block 465, processing logic selects an operating point for each of the vectored group and the second group based on the estimated performance targets.

At block 470, processing logic assigns configurable values to approximate the operating point selected for each of the vectored group and the second group.

At block 475, processing logic configures the communications system via the operational interface to adopt the assigned configurable values.

In certain embodiments, the method 401 may optionally repeat, and thus, processing logic at block 480 causes the method 401 to repeat the collecting of operational data from the plurality of copper telephone lines having been configured to adopt the assigned configurable values and then iterate through block 485, returning to the beginning of the process flow above block 450.

In such embodiments, processing logic at block 450 collects operational data or repeats the collecting of operational data from the plurality of copper telephone lines having been configured to adopt the assigned configurable values and then proceeds through the estimate, select, assign, and configure blocks 460-475 to re-adjust the assigned configurable values. In certain embodiments this iterative process may skip some steps that have been previously performed, such as the estimation in 460 or selection of an operating point in 465.

According to one embodiment, the vectored group having the first subset of the plurality of copper telephone lines comprises a first vectored, group of vectored lines; and wherein the second group having lines among the remaining copper telephone lines which are not part of the vectored group comprises a second vectored group of vectored lines which are exclusive from the first vectored group of vectored lines. Stated differently, the vectored group and the second group constitute two separate and distinct vectored groups, each having a plurality of vectored lines therein which are exclusive to the respective vectored groups and do not overlap in any way.

In an alternative embodiment, the vectored group and the second group constitute a vectored group and a non-vectored group respectively, again with the lines being exclusive to the distinct groups without any overlap. Additionally, the non-vectored group may have only a single non-vectored line therein. Thus, according to one embodiment, the vectored group having the first subset of the plurality of copper telephone lines comprises a first vectored group of vectored lines; and wherein the second group having lines among the remaining one or more of the copper telephone lines which are not pan of the vectored group comprises a group having non-vectored copper telephone lines therein, the second group having exactly one non-vectored copper telephone line from among the remaining one or more of the copper telephone lines which are not part of the vectored group or multiple non-vectored copper telephone lines from among the remaining copper telephone lines which are not part of the vectored group.

According to one embodiment, the communications system is a Digital Subscriber Line (DSL) communication system and the plurality of copper telephone lines constitute, a plurality of DSL lines or DSL loops for carrying DSL communication signals, wherein the DSL lines or DSL loops are compatible with at least one of the following DSL protocols: DSL, VDSL, VDSL2, vectored VDSL2, and G.fast.

According to one embodiment, the selected operating point is approximately achieved on one or more of the copper telephone lines by setting configurable values selected from one or more of: target bit rate, range of target bit rates, maximum bit rate, transmit power, range of transmit powers. Power Spectral Density (PSD) mask, target noise margin, maximum noise margin, carrier mask, and transmit passbands defining a set of frequencies over which data is transmitted.

According to one embodiment, estimating the achievable performance targets comprises estimating achievable target bit rates or estimating a range of achievable target bit rates.

According to one embodiment, the one or more achievable performance targets are estimated based upon each being jointly achievable by the respective vectored group and the second group.

According to one embodiment, the operating points selected for the vectored group and the second group are selected from an achievable rate region of performance tradeoffs to each of the vectored group and the second group such that improved performance to the vectored group is accompanied by degraded performance of the second group and visa-versa.

According to one embodiment, the operating points are selected to limit crosstalk between the vectored group and the second group to a threshold level, in which the performance tradeoffs for each of the vectored group and the second group correspond to bit rates and one or more other performance targets known to be achievable based on the estimating.

According to one embodiment, the one or more achievable performance targets for each of the vectored group and the second group includes at least one of: (i) rendering a general prediction for an entire regional loop plant encompassing the plurality of copper telephone lines based upon statistical properties for the entire regional loop plant without requiring per-line statistics for the plurality of copper telephone lines constituting the vectored group and the second group: (ii) rendering a specific knowledge prediction for the plurality of copper telephone lines based upon per-line statistics for each the plurality of copper telephone lines including statistics for the plurality of copper telephone lines selected from one or more of: a quantity of lines, cable and binder assignments for the lines, line lengths, crosstalk coupling levels amongst the lines, background noise levels affecting the lines, and exposure length defined as a port of the cable which is shared by the lines of the vectored group and the lines of the second group through which crosstalk coupling occurs; and (iii) rendering a performance based prediction based on operational performance of the plurality of copper telephone lines or operational capabilities for equipment associated with the plurality of copper telephone lines, or both.

For example, where configuration is based on the "exposure length" for the lines, the shared cabling length and location of the shared portion of the cable where the two groups crosstalk into each other may be known. For instance, the exposure length may begin at 10' from the central office and end 100' feet away. Where such data is known, the exposure length may be an important consideration in the configuration of the lines.

Configuration based on specific equipment performance and capabilities for equipment may include knowledge that certain equipment supports only support simple flat PSD bit-loading algorithms while other equipment is known to support more advanced bit-loading algorithms such as waterfilling, IWF, and/or more expansive vectoring capabilities. Different types of equipment often have their own predictable performance limitations and such data may be known and thus usable in the prediction, estimation, and configuration operations.

According to one embodiment, assigning configurable values to approximate the operating point selected for each of the vectored group and the second group, includes: assigning configurable values to each of the plurality of copper telephone lines within the vectored group and to each of the one or more remaining copper telephone lines in the second group, in which each line may have assigned configurable values which are identical to or different from any other line.

For instance, common configurable values may be assigned to each of the lines constituting the vectored group and then separately the second group simply by assigning the configurable values to the respective groups. These group level assignments cause the underlying lines to simply adopt the common group assigned configurable values.

According to one embodiment, the method further includes grouping the first subset according to line length to establish multiple line length sub-groupings within the vectored group, each corresponding to one or more copper telephone lines within a threshold length for the respective grouping or grouping the second subset according to line length to establish multiple line length sub-groupings within the second group, or both, in such an embodiment, assigning configurable values to approximate the operating point selected for each of the vectored group and the second group includes assigning configurable values to each of the multiple line length sub-groupings, in which lines within each of the multiple line length sub-groupings of the vectored group or the second group are assigned common configurable values and further in which each of the multiple line length sub-groupings may have assigned configurable values which are identical to or different from any other line length sub-grouping. Stated differently, the vectored group and the second group may be broken down further into sub-groupings on the basis of line length, within the respective vectored group and second group as independent sets. Thus, there may be a 75' to 100' sub-grouping within the vectored group, or within the second group, or one such sub-grouping within both groups.

According to one embodiment, the shorter lines among the plurality of copper telephone lines are assigned configurable values to establish higher performance targets than longer lines among the plurality of copper telephone lines and visa-versa.

According to one embodiment, estimating one or more achievable performance targets such as achievable bit rates for each of the vectored group and the second group includes at least estimating Far end crosstalk (FEXT) coupling for each of the plurality of copper telephone lines according to estimated received FEXT power for the respective line, where higher received FEXT power is indicative of stronger FEXT coupling into other lines among the plurality of copper telephone lines than lines associated, with lower received FEXT power. In such an embodiment, assigning configurable values to approximate the operating point selected for each of the vectored group and the second group includes assigning lower achievable performance targets to lines among the plurality of copper telephone lines corresponding to higher FEXT coupling than other lines among the plurality of copper telephone lines corresponding to lower FEXT coupling and visa-versa.

According to one embodiment, assigning configurable values to approximate the operating point selected for each of the vectored group and the second group, includes one or more of: weighting one or more of the configurable values assigned according to service levels for users associated with a corresponding one or mom: of the plurality of copper telephone lines: applying target bit rates and SNR (Signal-To-Noise Ratio) margin targets to the lines in the vectored group or to the lines in the second group or to both; applying a power back-off (PBO) to the lines in the vectored group or to the lines in the second group or to both; applying a waterfiling criteria to determine bit-loadings and transmit PSDs to the lines in the vectored group or the lines in the second group or both; and coordinating assignment of the configurable values with a centralized management system associated with the communications system to match the configurable values to be assigned with appropriate values for requested performance levels of one or more of the plurality of copper telephone lines.

According to one embodiment, assigning configurable values is partially delegated to distributed transceivers coupled with the plurality of copper telephone lines of the communications system by any one of: (i) assigning acceptable ranges for the configurable values and instructing the transceivers of the communications system to adopt configurable values within the acceptable ranges of configurable values assigned; (ii) enabling the transceivers coupled with the respective plurality of copper telephone lines of the communications system to access a centralized database of the communications system and to retrieve information about other nearby lines, to retrieve information about a cable environment for the plurality of copper telephone lines, and to retrieve performance targets upon which the configurable values may be assigned at the transceivers; and (iii) enabling transceivers within the communications system to approximately achieve their performance targets based on crosstalk impact of the transceivers communications to other lines amongst the plurality of copper telephone lines, in which each transceiver estimates its crosstalk affects on the other copper telephone lines by estimating its impact on a theoretical typical victim line.

Where the assigning of configurable values is partially delegated, the transceivers or other equipment are assigned a range of settings such as bit rate, power, margin, PSD level, carrier masks, and passbands defining a set of frequencies over which data is transmitted, the range(s) of settings being those permissible for the transceivers according to the assignment, and the transceivers then self-select, that is, decide on their own, which specific value to use from the permissible range assigned.

According to one embodiment, assigning configurable values to approximate the operating point selected for each of the vectored group and the second group includes: selecting the operating points based upon a goal of achieving operational compatibility between G.fast and VDSL lines operating within the communications system and corresponding to the plurality of copper telephone lines.

According to one embodiment, the method further includes collecting operational data from the plurality of copper telephone lines organized into the vectored group and the second group. In such an embodiment, the estimating of achievable performance targets is based at least in part on the operational data collected.

According to one embodiment, the method still further includes repeating the collecting of the operational data from the plurality of copper telephone lines having been configured to adopt the assigned configurable values; and repeating one or more of the steps of estimating, selecting, assigning, and configuring to re-adjust the assigned configurable values.

For instance, the method may iteratively collect operational data, then reset everything and re-collect the data and process all of the plurality of lines in a round-robin fashion so as to observe how a change on one line affects all the other lines. Thus, settings may be changed on line 1, and then operational data is collected to observe the change, and then line 1 is reset and settings are changed on line 2, and then operational data is again collected to observe the change, then line 2 is reset and settings are changed on line 3 and operational data is collected to observe the change, and so on. In such a way, setting changes affecting operation of a given line can be made and crosstalk coupling and other changes affecting the other lines can then be observed and determined in a systematic manner. This process may be repeated not just across a group of lines, but additionally, for a variety of settings and parameters, rotating through the various settings for a given line and rotating through the various lines, until an observed model is built up based on actually implemented operational settings.

Similarly, an approach may be applied using profiles rather than settings. Thus, according to one embodiment, the method further includes iteratively re-profiling at least one of the plurality of copper telephone lines to change a DSL configuration for the respective at least one copper telephone line, the iterative re-profiling including re-collecting the operational data from the plurality of copper telephone lines between iterations and applying a different profile at each iteration of the re-profiling.

Using re-profiling in conjunction with the means for managing mixed deployments of vectored and non-vectored DSL communication technologies including VDSL as is described herein may yield still further improvement to the overall operational condition of the plurality of copper telephone lines and the communications system as a whole. For instance, re-profiling to change DSL configurations may incrementally improve performance metrics such as bit rates, stability and power usage by repeatedly configuring a DSL line use available profile configurations, reading operational data after using a given profile configuration, selecting a possibly different) profile to use, configuring the new profile, and so forth for multiple profiles and multiple lines.

Additionally, use of re-profiling in such a way enables the re-profiling techniques to be used in a vectored environment or in a mixed vectored and non-vectored line group environment.

According to one embodiment there is a non-transitory computer readable storage medium having instructions stored thereon that, when executed by a processor in a management device, the instructions cause the vectoring manager to perform operations including: establishing an operational interface to a communications system, in which the communications system includes a plurality of copper telephone lines organized into at least a vectored group having a first, subset, of the plurality of copper telephone lines and a second group having a remaining one or more of the copper telephone lines which are not part of the vectored group; means for estimating one or more achievable performance targets such as achievable bit rates for each of the vectored group and the second group; means for selecting an operating point for each of the vectored group and the second group based on the estimated achievable performance targets; means for assigning configurable values to approximate the operating point selected for each, of the vectored group and the second group; and means for configuring the communications system via the operational interface to adopt the assigned configurable values.

Figure 5:
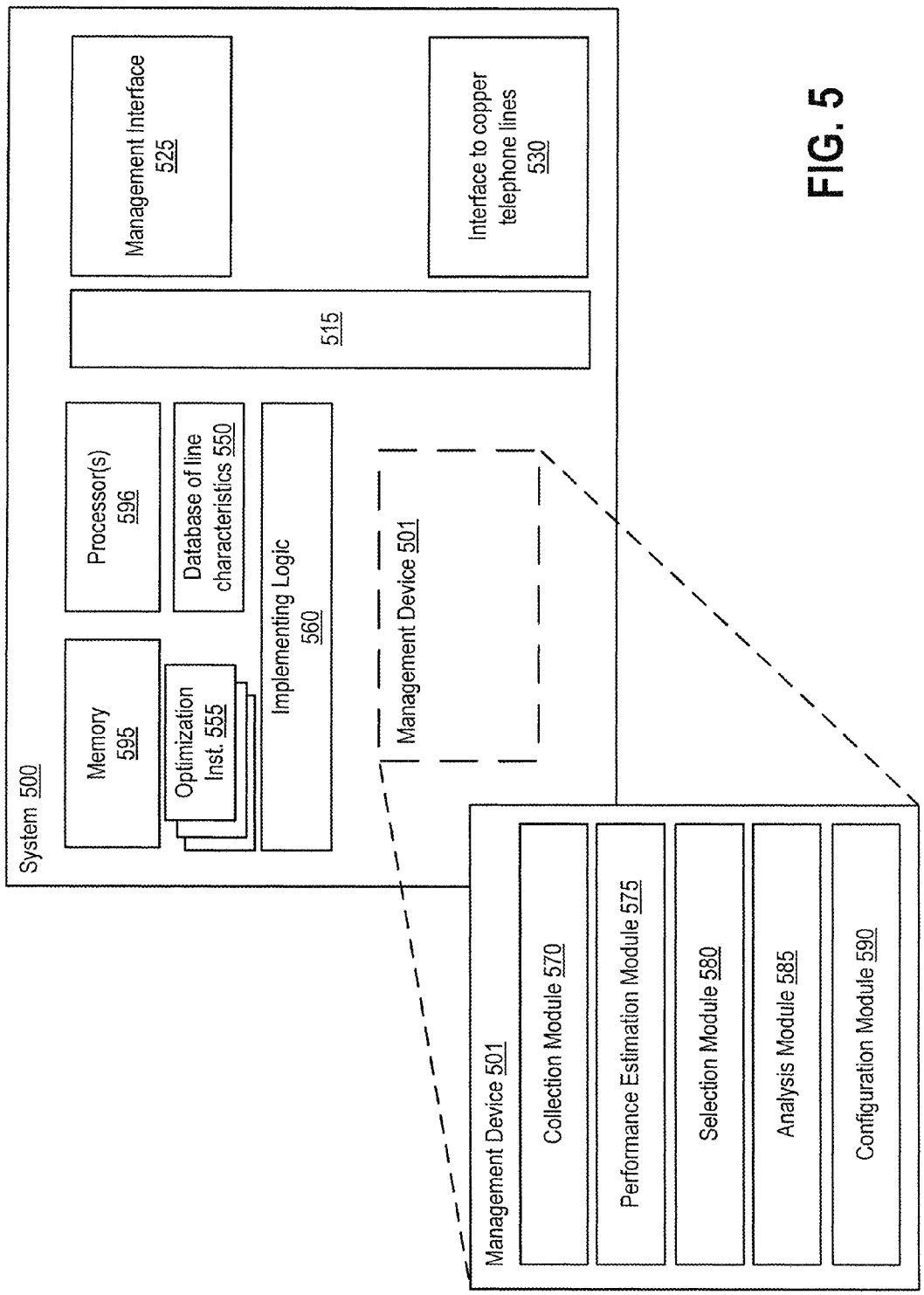
FIG. 5 illustrates a diagrammatic representations of a system in accordance with which embodiments may operate, be installed, integrated, or configured.

FIG. 5 illustrates a diagrammatic representations of a system 500 in accordance with which embodiments may operate, be installed, integrated, or configured.

In one embodiment, system 500 includes a memory 595 and a processor or processors 596. For example, memory 595 may store instructions to be executed and processor(s) 596 may execute such instructions. Processors) 596 may also implement or execute implementing logic 560 having logic to implement the methodologies discussed herein. System 500 includes communication bastes) 515 to transfer transactions, instructions, requests, and data within system 500 among a plurality of peripheral devices communicably interfaced with one or more communication buses 515. System 500 further includes management interface 525, for example, to receive requests, return responses, and otherwise interface with network elements located separately from system 500.

In some embodiments, management interface 525 communicates information via an out-of-band connection, separate from DSL line based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interlace over which to communicate control data between the system 500 and other networked devices or between the system 500 and a third party service provider.

System 500 further includes an interlace to the copper telephone lines 530 to communicate information via a LAN based connection, to monitor the copper telephone lines, DSL loops, DSL twisted pairs, and Digital communication lines which are interfaced to system 500. System 500 further includes a database of line characteristics 550 that may be analyzed or referenced when conducting analysis such as performance estimation and predictions as well as selection, of an operating point, and other functions. System 500 may further include multiple optimization instructions 555, any of which may be initiated responsive to analysis of the vectored and non-vectored lines. For example, corrective actions, additional diagnostics, information probes, configuration change requests, local commands, remote execution commands, and the like may be specified by and triggered as optimization instructions 555. The database of line characteristics 550 and the optimization instructions 555 may be stored upon a hard drive, persistent data store, a database, or other storage location within system 500.

Distinct within system 500 is management device 501 which includes collection module 570, performance estimation module 575, selection module 580, analysis module 585, and configuration module 590. Management device 501 may be installed and configured in a compatible system 500 as is depicted by FIG. 5, or provided separately so as to operate in conjunction with appropriate implementing logic 560 or other software.

In accordance with one embodiment there is a system having a processor 596 and a memory 595 therein, in which the system 500 further includes: an interface 525 to a communications system, the communications system having a plurality of copper telephone lines organized into at least a vectored group having a first subset of the plurality of copper telephone lines and a second group having a remaining one or more of the copper telephone lines which are not part of the vectored group; a performance estimation module 575 to estimate achievable performance targets for each of the vectored group and the second group; a selection module 580 to select an operating point for each of the vectored group and the second group based on the estimated achievable performance targets; an analysis module 585 to assign configurable values to approximate the operating point selected for each of the vectored group and the second group; and a configuration module 590 to configure the communications system via the operational interface 525 to adopt, the assigned configurable values.

In accordance with another embodiment, the system 500 may further include a collection module 570 to collect operational data from the plurality of copper telephone lines organized into the vectored group and the second group. In such an embodiment, the performance estimation module 575 is to estimate the achievable performance targets based at least in part on the operational data collected via the collection module 570 of the management device 501.

According to another embodiment, the system 500 operates as a server of a cloud service provider physically remote from a Customer Premises Equipment (CPE) modem at a business or residence of a DSL subscriber associated with one of the plurality of copper telephone lines and physically remote from a Central Office (CO) which provides communication services to the CPE modem; and further in which the configuration module is to issue configuration instructions for the CPE modem associated with one of the plurality of copper telephone lines to configure a transceiver of the CPE modem using the assigned configurable values.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or mom of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc, static memory such as flash memory, static random access memory (SRAM), volatile but high-data rate RAM, etc.), and a secondary memory 618 (e.g., a persistent storage device Including hard disk drives and persistent data base implementations), which communicate with each other via a bus 630. Main memory 604 includes information and instructions and software program components necessary for performing and executing the functions with respect to the various embodiments of the systems, methods, and management device as described herein. Optimization instructions 623 may be triggered based on, for example, analysis of collected operational, data, known line statistics, known equipment capabilities and limitations, and so forth. Prediction models 624 may be stored within, main memory 604 for use in estimating and predicting operational characteristics of the lines undergoing evaluation. Optimization instructions 623 may be stored within main memory 604 and as collected and determined by management device 634. Main memory 604 and its sub-elements (e.g. 623 and 624) are operable in conjunction with processing logic 626 and/or software 622 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include one or more network interface cards 608 to communicatively interface the computer system 600 with one or more networks 620 from which information may be collected for analysis. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal, generation device 616 (e.g., an integrated speaker). The computer system 600 may further include peripheral device 636 (e.g., wireless or wired communication devices, memory devices, storage devices, audio processing devices, video processing devices, etc.). The computer system 600 may perform the functions of a management device 634 capable of interfacing with digital communication lines such as copper telephone lines within a vectored and non-vectored groups, monitoring, collecting, analyzing, and reporting information, and initiating, triggering, and executing various optimization instructions 623 including the execution of commands and instructions to alter characteristics and operation of vectoring mechanisms and those lines associated with vectoring deployments.

The secondary memory 618 may include a non-transitory machine-readable storage medium (or more specifically a non-transitory machine-accessible storage medium) 631 on which is stored one or more sets of instructions (e.g., software 622) embodying any one or more of the methodologies or functions described herein. Software 622 may also reside, or alternatively reside within main memory 604, and may further reside completely or at least partially within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements, it is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such, claims are entitled.

What is claimed is:

1. A method comprising:
   establishing an operational interface to a communications system, the communications system having a plurality of copper telephone lines organized into at least a vectored group having a first subset of the plurality of copper telephone lines and a second group having a remaining one or more of the copper telephone lines which are not part of the vectored group;
   estimating one or more jointly achievable performance targets by the at least a vectored group and the second group;

selecting an operating point for each of the vectored group and the second group based on the estimated achievable performance targets;

assigning configurable values to approximate the operating point selected for each of the vectored group and the second group; and configuring the communications system via the operational interface to adopt the assigned configurable values.

2. The method of claim 1:
wherein the vectored group having the first subset of the plurality of copper telephone lines comprises a first vectored group of vectored lines; and
wherein the second group having lines among the remaining copper telephone lines which are not part of the vectored group comprises a second vectored group of vectored lines which are exclusive from the first vectored group of vectored lines.

3. The method of claim 1:
wherein the vectored group having the first subset of the plurality of copper telephone lines comprises a first vectored group of vectored lines; and
wherein the second group having lines among the remaining one or mom of the copper telephone lines which are not part of the vectored group comprises a group having non-vectored copper telephone lines therein, the second group having exactly one non-vectored copper telephone line from among the remaining one or more of the copper telephone lines which are not part of the vectored group or multiple non-vectored copper telephone lines from among the remaining copper telephone lines which are not part of the vectored group.

4. The method of claim 1, wherein the communications system comprises a Digital Subscriber Line (DSL) communication system and wherein the plurality of copper telephone lines comprise a plurality of DSL lines or DSL loops for carrying DSL communication signals, wherein the DSL lines or DSL loops are compatible with at least one of the following DSL, protocols; DSL, VDSL, VDSL2, vectored VDSL2, and G.fast.

5. The method of claim 1, wherein the selected operating point is approximately achieved on one or more of the copper telephone lines by setting configurable values selected from one or more of: target bit rate, range of target bit rates, maximum bit rate, transmit power, range of transmit powers, Power Spectral Density (PSD) mask, target noise margin, maximum noise margin, carrier mask, and transmit passbands defining a set of frequencies over which data is transmitted.

6. The method of claim 5, wherein estimating the achievable performance targets comprises estimating achievable target bit rates or estimating a range of achievable target bit rates.

7. The method of claim 1, wherein the operating points selected for the vectored group and the second group are selected from an achievable rate region of performance tradeoffs to each of the vectored group and the second group such that improved performance to the vectored group is accompanied by degraded performance of the second group and visa-versa.

8. The method of claim 7, wherein the operating points are selected to limit crosstalk between the vectored group and the second group to a threshold level, wherein the performance tradeoffs for each of the vectored group and the second group correspond to bit rates and one or more other performance targets known to be achievable based on the estimating.

9. The method of claim 1, wherein estimating the one or more jointly achievable performance targets by the at least a vectored group and the second group comprises at least one of:
i. rendering a general prediction for an entire regional loop plant encompassing the plurality of copper telephone lines: based upon statistical properties for the entire regional loop plant without requiring per-line statistics for the plurality of copper telephone lines constituting the vectored group and the second group;
ii. rendering a specific knowledge prediction for the plurality of copper telephone lines based upon per-line statistics for each the plurality of copper telephone lines including statistics for the plurality of copper telephone lines selected front one or more of; a quantity of lines, cable and binder assignments for the lines, line lengths, crosstalk coupling levels amongst the lines, background noise levels affecting the lines, and exposure length defined as a port of the cable which is shared by the lines of the vectored group and the lines of the second group through which crosstalk coupling occurs; and
iii. rendering a performance based prediction based on operational performance of the plurality of copper telephone lines or operational capabilities for equipment associated with the plurality of copper telephone lines, or both.

10. The method of claim 1, wherein assigning configurable values to approximate the operating point selected for each of the vectored group and the second group, comprises: assigning configurable values to each of the plurality of copper telephone lines within the vectored group and to each of the one or more remaining copper telephone lines in the second group, wherein each line may have assigned configurable values which are identical to or different from any other line.

11. The method of claim 1, further composing:
grouping the first subset according to line length to establish multiple line length sub-groupings within the vectored group, each corresponding to one or more copper telephone lines within a threshold length for the respective grouping or grouping the second subset according to line length to establish multiple line length sub-groupings within the second group, or both; and
wherein assigning configurable values to approximate the operating point selected for each of the vectored group and the second group comprises assigning configurable values to each of the multiple line length sub-groupings, wherein lines within each of the multiple line length sub-groupings of the vectored group or the second group are assigned common configurable values and further wherein each of the multiple line length sub-groupings may have assigned configurable values which are identical to or different from any other line length sub-grouping.

12. The method of claim 11:
wherein shorter lines among the plurality of copper telephone lines are assigned configurable values to establish higher performance targets than longer lines among the plurality of copper telephone lines and visa-versa.

13. The method of claim 1:
wherein estimating the one or more jointly achievable performance targets by the at least a vectored group and the second group comprises at least estimating Far end crosstalk (FEXT) coupling for each of the plurality of copper telephone lines according to estimated received FEXT power for the respective line, where higher received FEXT power is indicative of stronger FEXT coupling into other lines among the plurality of copper telephone lines than lines associated with lower received FEXT power; and wherein assigning configurable values to approximate the operating point selected for each of the vectored group and the second group comprises assigning lower achievable performance targets to lines among the plurality of copper telephone lines corresponding to higher FEXT coupling than other lines among the plurality of copper telephone lines corresponding to lower FEXT coupling and visa-versa.

14. The method of claim 1, wherein assigning configurable values to approximate the operating point selected for each of the vectored group and the second group, comprises one or more of:
  weighting one or more of the configurable values assigned according to service levels for users associated with a corresponding one or more of the plurality of copper telephone lines;
  applying target, bit rates and SNR (Signal-To-Noise) margin targets to the lines in the vectored group or to the lines in the second group or to both;
  applying a power back-off (PBO) to the lines in the vectored group or to the lines in the second group or to both;
  applying a waterfilling criteria to determine bit-loadings and transmit Power Spectral Densities (PSDs) to the lines in the vectored group or the lines in the second group or both; and
  coordinating assignment of the configurable values with a centralized management system associated with the communications system to match the configurable values to lie assigned with appropriate values for requested performance levels of one or more of the plurality of copper telephone lines.

15. The method of claim 1, wherein assigning configurable values is partially delegated to distributed transceivers coupled with the plurality of copper telephone lines of the communications system by any one of:
  i. assigning acceptable ranges for the configurable values and instructing the transceivers of the communications system to adopt configurable values within the acceptable ranges of configurable values assigned:
  ii. enabling the transceivers coupled with the respective plurality of copper telephone lines of the communications system to access a centralized database of the communications system and to retrieve information about other nearby lines, to retrieve information about a cable environment for the plurality of copper telephone lines, and to retrieve performance targets upon which the configurable values may be assigned at the transceivers; and
  iii. enabling transceivers within the communications system to approximately achieve their performance targets based on crosstalk impact of the transceivers communications to other lines amongst the plurality of copper telephone lines, wherein each transceiver estimates its crosstalk affects on the other copper telephone lines by estimating its impact on a theoretical typical victim line.

16. The method of claim 1, wherein assigning configurable values to approximate the operating point selected for each of the vectored group and the second group, comprises selecting the operating points based upon a goal of achieving operational compatibility between G.fast and VDSL lines operating within the communications system and corresponding to the plurality of copper telephone lines.

17. The method of claim 1, further comprising:
  collecting operational data from the plurality of copper telephone lines organized into the vectored group and the second group; and
  wherein the estimating achievable performance targets is based at least in part on the operational data collected.

18. The method of claim 17, further comprising;
  repeating the collecting of operational data from the plurality of copper telephone lines having been, configured to adopt the assigned configurable values; and
  repeating one or more of the steps of estimating, selecting, assigning, and configuring to re-adjust the assigned configurable values.

19. The method of claim 17, further comprising:
  iteratively re-profiling at least one of the plurality of copper telephone lines to change a DSL configuration for the respective, at least one copper telephone line, the iterative re-profiling including re-collecting the operational data from the plurality of popper telephone lines between iterations and applying a different profile at each iteration of the re-profiling.

20. A non-transitory computer readable storage medium having Instructions stored thereon that, when executed by a processor in a management device, the instructions cause the management device to perform operations comprising;
  establishing an operational interface to a communications system, the communications system having a plurality of copper telephone lines organized into at least a vectored group having a first subset of the plurality of copper telephone lines and a second group having a remaining one or more of the copper telephone lines which are not part of the vectored group;
  estimating one or more jointly achievable performance targets by the at least a vectored group and the second group;
  selecting an operating point for each of the vectored group and the second group based on the estimated achievable performance targets;
  assigning configurable values to approximate the operating point selected for each of the vectored group and the second group; and
  configuring the communications system via the operational interface to adopt the assigned configurable values.

21. A system comprising;
  an interface to a communications system, the communications system having a plurality of copper telephone lines organized into at least a vectored group having a first subset of the plurality of copper telephone lines and a second group having a remaining one or more of the copper telephone lines which are not part of the vectored group;
  a performance estimation module to estimate one or more jointly achievable performance targets by the at least a vectored group and the second group;
  a selection module to select an operating point for each of the vectored group and the second group based on the estimated achievable performance targets;
  an analysis module to assign configurable values to approximate the operating point selected for each of the vectored group and the second group; and a configuration module to configure the communications system via the operational interface to adopt the assigned configurable values.

22. The system of claim 21, further comprising:
a collection module to collect operational data from the plurality of copper telephone lines organized into the vectored group and the second group; and
wherein the performance estimation module is to estimate the achievable performance targets based at least in part on the operational data collected.

23. The system of claim 21, wherein the system operates as a server of a cloud service provider physically remote from a Customer Premises Equipment (CPE) modem at a business or residence of a DSL subscriber associated with one of the plurality of copper telephone lines and physically remote from a Central Office (CO) which provides communication services to the CPE modem; and
wherein the configuration module to issue configuration instructions for the CPE modem associated with one of the plurality of copper telephone lines to configure a transceiver of the CPE modem using the assigned configurable values.

\* \* \* \* \*